US008966042B2

(12) United States Patent
Langer et al.

(10) Patent No.: US 8,966,042 B2
(45) Date of Patent: Feb. 24, 2015

(54) DIFFERENTIATING BOOKMARKS IN CONTENT ACCESS LISTS SHARED AMONG MULTIPLE CONTENT PLAYER DEVICES

(75) Inventors: Paul A. Langer, Westminster, CO (US); Dan J. Minnick, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 154 days.

(21) Appl. No.: 13/301,312

(22) Filed: Nov. 21, 2011

(65) Prior Publication Data
US 2013/0132543 A1     May 23, 2013

(51) Int. Cl.
*G06F 15/173*     (2006.01)
*G06F 17/30*     (2006.01)

(52) U.S. Cl.
CPC .............................. *G06F 17/30855* (2013.01)
USPC ................. 709/223; 725/25; 725/38; 725/46; 725/58; 725/80; 725/88; 725/13; 725/138; 386/241

(58) Field of Classification Search
CPC ................................................ G06F 17/30884
USPC .......... 709/223; 725/38, 58, 88, 134; 386/241
See application file for complete search history.

(56) References Cited

U.S. PATENT DOCUMENTS

| 8,051,081 B2 * | 11/2011 | Shahraray et al. ............ 707/736 |
| 8,429,696 B2 * | 4/2013 | Tecot et al. ...................... 725/80 |
| 8,434,111 B2 * | 4/2013 | Levy et al. ....................... 725/46 |
| 2005/0166258 A1 * | 7/2005 | Vasilevsky et al. ............ 725/138 |
| 2009/0049118 A1 | 2/2009 | Stevens |
| 2009/0106793 A1 * | 4/2009 | Tecot et al. ...................... 725/38 |
| 2012/0054808 A1 * | 3/2012 | Nijim ............................... 725/88 |
| 2012/0072543 A1 * | 3/2012 | Kalmanje et al. ............. 709/219 |
| 2012/0229588 A1 * | 9/2012 | Greenfield .................. 348/14.04 |
| 2012/0291060 A1 * | 11/2012 | Relyea et al. .................... 725/25 |

FOREIGN PATENT DOCUMENTS

| WO | 03067594 A1 | 8/2003 |
| WO | 2010018991 A2 | 2/2010 |
| WO | 2010103325 A2 | 9/2010 |

OTHER PUBLICATIONS

European Patent Office "International Search Report and Written Opinion" dated Mar. 6, 2013 for International Patent Appln. No. PCT/SU2012/066124.

* cited by examiner

*Primary Examiner* — Joon H Hwang
*Assistant Examiner* — Cheikh Ndiaye
(74) *Attorney, Agent, or Firm* — Ingrassia Fisher & Lorenz, P.C.

(57) ABSTRACT

A content player accesses content via a content access list shared by a network of players. The content is stored by one or more of the players. One or more of the players may be thin clients that can access content stored by other players but cannot themselves store content. The content access list lists available stored content. The content player associates a bookmark with the content and includes identification information that identifies the requestor related to generation of the bookmark. When the content player presents the content access list, bookmarks associated with content included in list are also be along with the identification information. In some implementations, the requestor related to generation of the respective bookmark may be the content player that generated the bookmark, the specific user that entered input that prompted generation of the bookmark, and/or a combination thereof.

20 Claims, 7 Drawing Sheets

DIFFERENTIATING BOOKMARKS IN CONTENT ACCESS LISTS SHARED AMONG MULTIPLE CONTENT PLAYER DEVICES

FIELD OF THE INVENTION

This disclosure relates generally to shared content, and more specifically to content access lists shared among multiple content player devices that differentiate the requestor that created bookmarks.

SUMMARY

The present disclosure discloses systems and methods for differentiating bookmarks in content access lists shared among multiple content player devices. A content player may access an instance of content via a content access list shared by a network of content players. The instance of content may be stored by one or more of the content players of the network. One or more of the content players may be thin clients that can access content stored by other content players but cannot themselves store content. The content access list may list content that is available to the content players of the network. When accessing the instance of content, the content player may associate a bookmark with the instance of content. As part of associating the bookmark, the content player may include identification information with the bookmark that identifies the requestor related to generation of the bookmark. When the content player presents the content access list, bookmarks associated with instances of content included in the content access list may be also be presented. As part of presenting the bookmarks, identification information included with the bookmarks that identifies the requestor related to generation of the respective bookmark may also be presented. Such identification information may include text, graphics, video, audio, and/or any other type of identifying information.

In some implementations, the requestor related to generation of the respective bookmark may be the content player that generated the bookmark. In other implementations, the requestor related to generation of the respective bookmark may be the specific user that entered input that prompted generation of the bookmark. In still other implementations, the requestor related to generation of the respective bookmark may be a combination of the generating content player and the specific user that utilized that content player.

In various implementations, the content player may present all bookmarks associated with instances of content included in the content access list (as well as the identifying information that identifies the requestor related to generation of the respective bookmark) when presenting the content access list. However, in various other implementations the content player may omit one or more bookmarks associated with instances of content included in the content access list, such as bookmarks related to users other than a user who requested presentation of the content access list.

In one or more implementations, recorder information may be associated with the instance of content that identifies the content player of the network that recorded the instance of content (whether the content player recorded the instance of content to its own storage device or to a storage device of another content player of the network). As such, when presenting the content access list, the content player may display the recorder information for the instance of content that identifies the content player that recorded the instance of content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Content players (such as set top boxes, television receivers, digital video recorders, television tuners, digital music players, desktop computers, laptop computers, cellular telephones, smart phones, mobile computing devices, and so on) may present content via one or more presentation devices (such as computer monitors, televisions, cathode ray tube displays, liquid crystal displays, speakers, printers, and/or other such devices for presenting content). The content that such content players may present may be stored by the content players and/or may be received from one or more content providers (such as one or more television programming providers, video on demand providers, pay per view movie providers, digital music providers, and so on) via one or more communication links (such as one or more satellite communication links, coaxial cable communication links, WiFi communication links, Internet protocol communication links, and so on). Such content may include television programs, movies, other video files, audio files, data files, and/or any other kind of content that may be presented by such a content player.

In some situations, a number of content players may be connected via a network in order to share content among the content players for presentation. In such implementations, one or more of the content players may store content that other content players in the network may access. By way of one example, all content players in the network may store content and each of the content players in the network may be able to access and present content stored by the other content players. By way of another example, one content player in the network may act as a server, storing and serving content, while the other content players in the network act as thin clients that do not store and instead only access the content stored by the server content player. Various other combinations between these two examples are also possible. Regardless, in such implementations, a content access list may be maintained by one or more of the content players in the network that lists the instances of content that are available. The content players of the network may share the content access list, present the content access list upon user request, and may utilize the content access list to access the available instances of content.

In various situations, content players may be configured to generate one or more bookmarks associated with an instance of content. For example, when a content player accessed an instance of content for presentation and the presentation is not completed (such as where a user watches part of a recorded television program), the content player may (either automatically and/or at user request) generate a bookmark that marks the portion of the instance of content where presentation stopped and associate the bookmark with the instance of content. Then, when that same instance of content is subsequently accessed, the content player may be able to utilize the bookmark to continue presenting the content from the portion of the instance of content where presentation previously stopped. By way of another example, user may request that a content player mark particular portions of an instance of content that the user wishes to revisit later. The content player may generate the user requested bookmark and associate it with the instance of content so that the bookmark can subsequently utilize the bookmark to revisit the marked particular portion.

In some cases, bookmarks associated with instances of content may be presented as part of presenting a list of content available for access. As such, a user may select to access a portion of an instance of content associated with the bookmark instead of accessing the instance of content from the beginning. However, in cases where multiple different users utilize a content player, users may become confused as to which bookmarks relate to which users. This may be greatly exacerbated by the situation discussed above where multiple content players in a network share a content access list as not only may it not be evident which bookmark relates to which user, it may also not be evident which bookmarks are related to which content players. Such confusion may greatly reduce the usefulness of such bookmarks for users.

The present disclosure discloses systems and methods for differentiating bookmarks in content access lists shared among multiple content player devices. A content player may access an instance of content via a content access list shared by a network of content players where the content access list lists content available to content players of the network. The content player may associate a bookmark with the instance of content and may include identification information with the bookmark that identifies the requestor related to generation of the bookmark (which may be the content player that generated the bookmark, the specific user that entered input that prompted generation of the bookmark, a combination of the generating content player and the specific user that utilized that content player, and so on). When a content player of the network presents the content access list, bookmarks associated with instances of content may be presented along with included identification information that identifies the requestor related to generation of the respective bookmark. In this way, confusion as to which bookmark relates to which content player and/or which user may be reduced and usefulness of such bookmarks may be increased.

Figure 1:
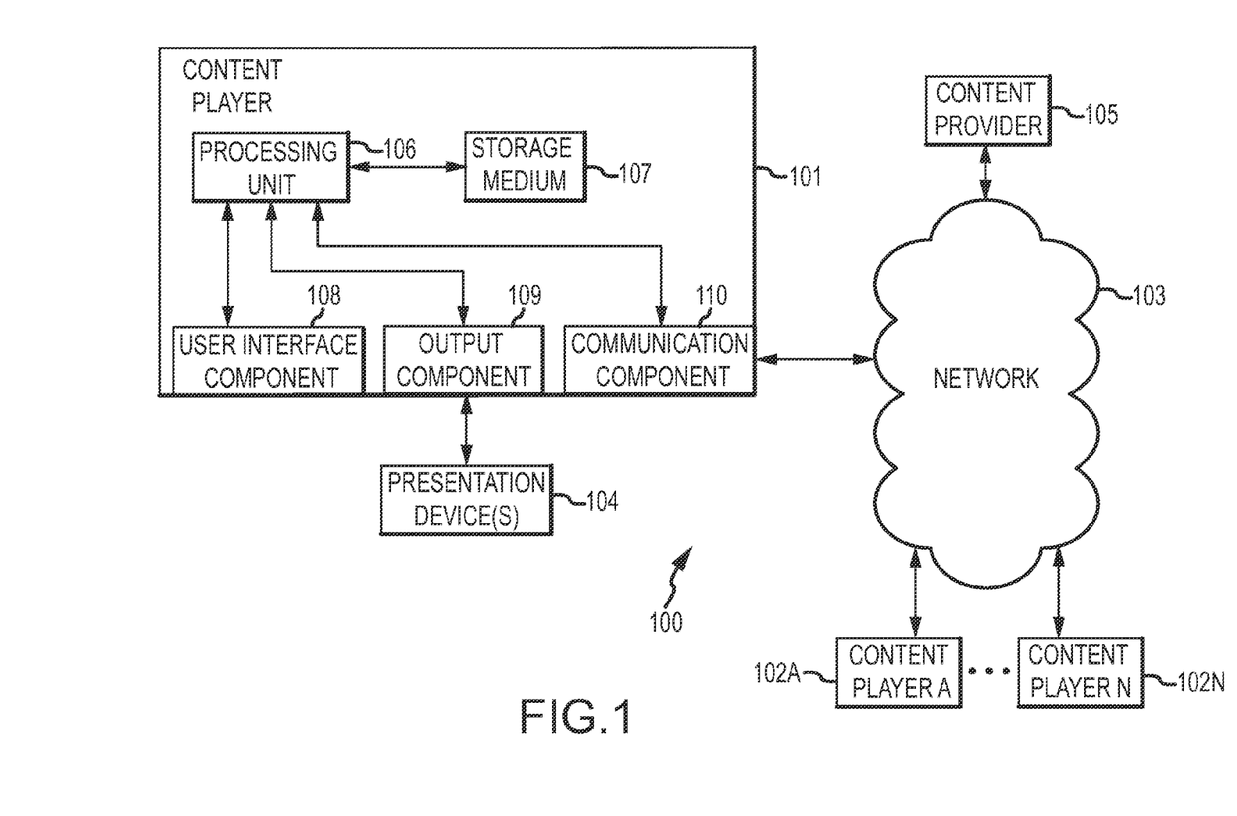
FIG. 1 is a block diagram illustrating a system for differentiating bookmarks in content access lists shared among multiple content player devices.

FIG. 1 is a block diagram illustrating a system 100 differentiating bookmarks in content access lists shared among multiple content player devices. The system 100 includes a content player 101 and content players A-N 102A-102N (which each may be any kind of content player such as a set top box, a television receiver, a digital video recorder, a television tuner, a digital music player, a desktop computer, a laptop computer, a cellular telephone, a smart phone, a mobile computing device, and/or any other kind of device operable to play content) that are communicably coupled by one or more networks 103 (which may be an Ethernet network, a coaxial cable network, a WiFi network, a HomePlug network, a MoCA® (Multimedia Over Coax Alliance) network, and/or any other kind of wired and/or wireless network that communicably connects the content player 101 and the content players A-N 102A-102N).

The content player 101 (and/or the content players A-N 102A-102N) may include one or more processing units 106, one or more non-transitory storage media 107 (which may take the form of, but is not limited to, a magnetic storage medium; optical storage medium; magneto-optical storage medium; read only memory; random access memory; erasable programmable memory; flash memory; and so on), one or more user interface components 108, one or more output components 109, and/or one or more communication components 110. The processing unit may execute instructions stored in the non-transitory storage medium to transmit one or more instances of content to one or more presentation devices 104 (which may be any kind of presentation device such as a television, computer monitor, speaker, cathode ray tube display, liquid crystal display, plasma display, printer, and so on), via the output component. Further, the processing unit may execute instructions stored in the non-transitory storage medium to store one or more instances of content being received from the content provider and/or communicate with other content players connected to the network via the communication component. Such operations may be performed in response to user input received via the user interface component 108.

The one or more instances of content transmitted by the content player 101 (and/or the content players A-N 102A-102N) to the presentation device 104 may be content that is stored by the content player 101 and/or the content players A-N 102A-102N (such as content stored in the non-transitory storage medium 107) and/or content being received from the content provider 105 via the communication component. In various implementations, one or more of the content player 101 and/or the content players A-N 102A-102N may be operable to store one or more instances of content (such as in the non-transitory storage medium) whereas others of the content player 101 and/or the content players A-N 102A-102N may be thin clients that are able to access one or more instances of content stored by other content players connected to the network 103 but are not themselves able to store content (though the thin clients may store content received from the content provider 105 by transmitting such content to content players connected to the network that are able to store the content).

Regardless, one or more of the content player 101 and/or the content players A-N 102A-102N may maintain a content access list that is shared by the content players connected to the network 103 and lists instances of content stored by one or more the content players connected to the network that is available to the content player 101 and/or the content players A-N 102A-102N. The content player 101 may access one or more instances of content (such as for transmitting the content to the presentation device) utilizing this shared content list.

When the content player 101 accesses an instance of content utilizing the shared content list, the content player 101 may determine to generate a bookmark for the instance of content. In some cases, the content player 101 may make such a determination in response to input received via the user interface component 108 (such as a user marking a portion of the instance of content so that the user can later revisit that portion of the content). In other cases, the content player 101 may make such a determination in response to the occurrence of an event, such as stopping and/or other interruption of transmission of the instance of content to the presentation device 104 (which may mark a last-accessed portion of the instance of content so that the last-accessed portion may be returned to later). The content player 101 may generate such a bookmark, associate the bookmark with the instance of content (which may be stored with the instance of content, stored as part of the instance of content, and/or otherwise associated with the instance of content), and include identifying information that identifies the requestor that requested generation of the bookmark.

By way of a first example, in some implementations, the content player 101 may be considered the requestor that requested generation of the bookmark because the content player 101 determined to generate the bookmark. As such, the identification information may identify the content player. Such identification information may include a network address for the content player 101, a serial number or other unique identifier for the content player 101, a name identifier assigned to the content player 101 (such as the name identifier "living room set top box" assigned to a set top box located in a living room), and/or any other information that identifies the content player 101.

By way of a second example, in other implementations, the content player 101 may generate the bookmark in response to input received from a specified user via the user interface component. The specified user may be specified via one or more login processes, utilization of one or more control devices (such as remote controls) dedicated to that user, and/or any other way of identifying specific users. The specified user may be considered the requestor that requested generation of the bookmark because the content player 101 determined to generate the bookmark in response to input received from the specified user. As such, the identification information may identify the specified user. Such identification information may include a login identifier for the specified user and/or any other information that identifies the specified user.

By way of a third example, in still other implementations, a combination of the content player 101 and the specified user may be considered the requestor that requested generation of the bookmark because the content player 101 determined to generate the bookmark, but did so in response to input received from the specified user. As such, the identification information may identify the combination of the content player 101 and the specified user. For example, the identification information may include a combination of the unique identifier for the content player 101 and the login identifier for the specified user.

The content player 101 may access the content access list shared by the content players connected to the network 103 and transmit the content access list for presentation by the presentation device 104 in order to allow one or more users to request access to one or more instances of content listed by the content access list via the user interface component 108. Presentation of the content access list may list one or more instances of content as well as one or more bookmarks associated with the one or more instances of content. Presentation of one or more bookmarks as part of presenting the content access list (and/or presentation of one or more sub lists of the content access lists such as presentation of a list entry for a single instance of content selected from the content access list) may also present the identification information that identifies the requestor that generated the respective bookmark. Such presented identification information may include text associated with the requestor, one or more graphic elements associated with the requestor, audio associated with the requestor, video associated with the requestor, and/or any other identifier associated with the requestor. As such, the requestor associated with the bookmark may be apparent from presentation of the content access list and/or presentation of a sub list of the content access list.

For example, an instance of content may include a first last-accessed bookmark created by a first user utilizing a first content player connected to the network 103, a second last-accessed bookmark created by a second user utilizing a second content player connected to the network, and a user-specified bookmark created by the first user utilizing the first content player. Presentation of an entry in the content access list corresponding to the instance of content (or a sub list of the content access list) may include options for presenting the instance of content from the beginning, presenting the instance of content from the first user/first content player's last-accessed point, presenting the instance of content from the second user/second content player's last-accessed point, and/or presenting the instance of content from the first user/first content player's user-defined marker. The content player 101 may receive a selection of one of these options via the user interface component 108 and may present the instance of content via the presentation device 104 starting with the portion corresponding to the received selection.

In one or more implementations, when a content player of the network 103 stores an instance of content (whether storing the instance of content on a non-transitory storage medium of the content player of a non-transitory storage medium of another content player of the network), such as an instance of content received from the content provider 105, recorder information that identifies the content player that performed the recording may be associated with the instance of content (which may be stored with the instance of content, stored as part of the instance of content, and/or otherwise associated with the instance of content). Such recorder information may include a network address for the recording content player, a serial number or other unique identifier for the recording content player, a name identifier assigned to the recording content player (such as the name identifier "living room set top box" assigned to a set top box located in a living room), and/or any other information that identifies the recording content player. As such, when the content player 101 presents an entry in the content access list corresponding to the stored instance of content (or a sub list of the content access list), the content player 101 may present the recorder information that identifies the content player that recorded the instance of content.

In various implementations, when the content player 101 presents an entry in the content access list corresponding to an instance of content (or a sub list of the content access list), the content player 101 may omit presentation of one or more bookmarks associated with the instance of content. For example, if a particular user utilizes the user interface component 108 to request presentation of the content access list (or a sub list of the content access list), the content player 101 may present bookmarks associated with the instance of content that include identification information related to the particular user and omit presentation of bookmarks associated with the instance of content that include information related to other users. In this way, confusion related to bookmarks may be reduced as the particular user may only be presented with his bookmarks as opposed to bookmarks related to other users. Similarly, in another case, the content player 101 may present bookmarks associated with the instance of content that include identification information related to content player 101 and omit presentation of bookmarks associated with the instance of content that include information related to other content players.

Figure 2:
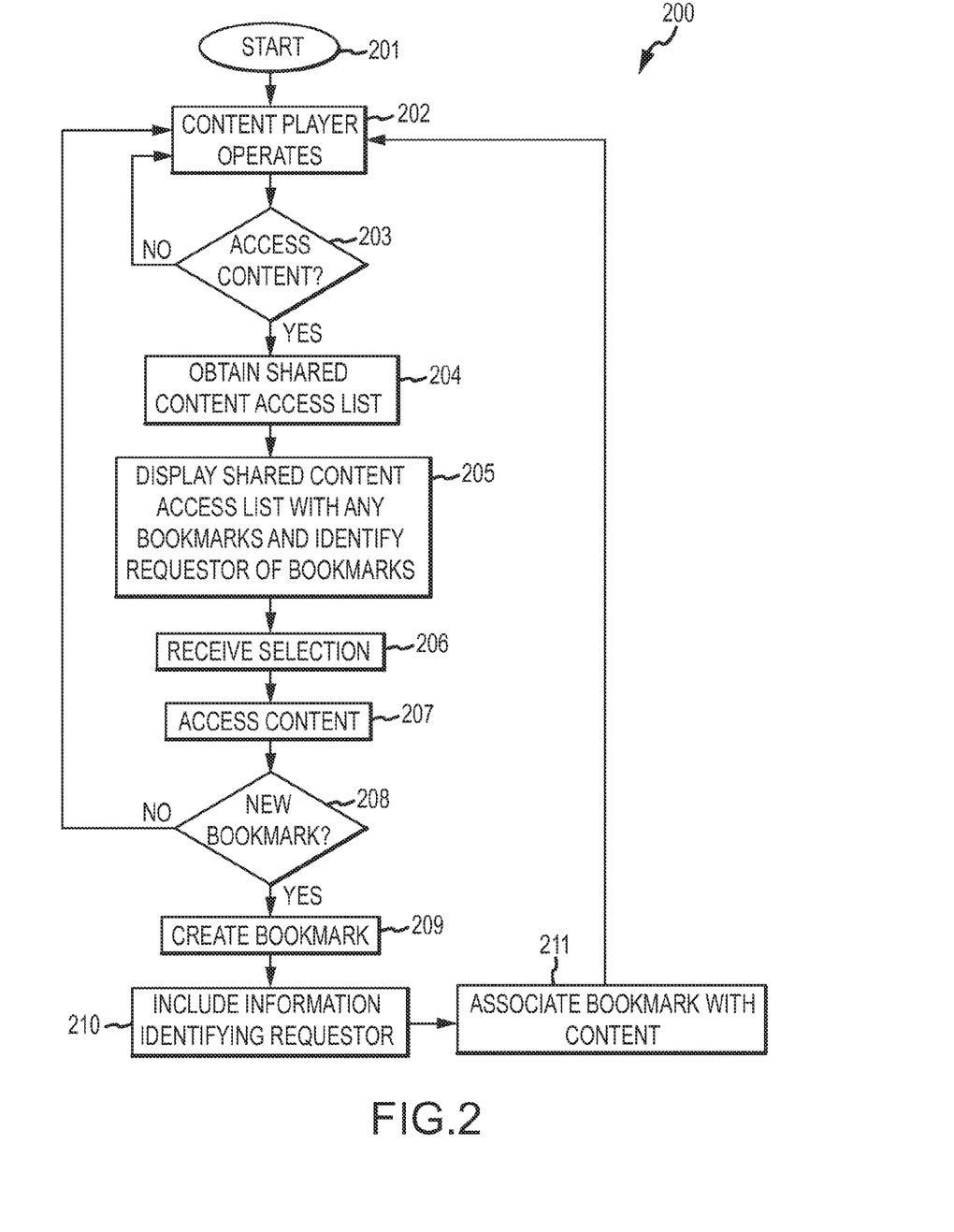
FIG. 2 is a flow chart illustrating a method for differentiating bookmarks in content access lists shared among multiple content player devices. This method may be performed by the system of FIG. 1.

FIG. 2 illustrates a method 200 for differentiating bookmarks in content access lists shared among multiple content player devices. The method 200 may be performed by the content player 101 of FIG. 1. The flow begins at block 201 and proceeds to block 202 where the content player 101 operates. The flow then proceeds to block 203 where the processing unit 106 determines whether or not to access content. The processing unit may determine to access content in response to input received via the user interface component 108. If so, the flow proceeds to block 204. Otherwise, the flow returns to block 202 where the content player 101 continues to operate.

At block 204, after the processing unit 106 determines to access content, obtains the shared content access list. The shared content access list may be stored by the content player 101 and/or one or more of the content players connected to the network 103. The flow then proceeds to block 205 where the processing unit displays the shared content access list (by transmitting the shared content access list to the presentation device 104 via the output component 109) along with any bookmarks and identification information included in such bookmarks that identify the requestor that requested generation of the respective bookmarks. Next, the flow proceeds to block 206 where the processing unit receives a selection of an instance of content via the user interface component 108 before the flow proceeds to block 207 and the processing unit accesses the selected instance of content. The flow then proceeds to block 208.

At block 208, after the processing unit 106 accesses the selected instance of content, the processing unit determines whether or not to create a new book mark. In some cases, the processing unit may make such a determination in response to input received via the user interface component 108 (such as a user marking a portion of the instance of content so that the user can later revisit that portion of the content). In other cases, the processing unit may make such a determination in response to the occurrence of an event, such as stopping and/or other interruption of transmission of the instance of content to the presentation device 104 (which may mark a last-accessed portion of the instance of content so that the last-accessed portion may be returned to later). If so, the flow proceeds to block 209. Otherwise, the flow returns to block 202 and the content player 101 continues to operate.

At block 209, after the processing unit 106 determines to create a new book mark, the processing unit creates the bookmark. The flow then proceeds to block 210 where the processing unit includes identification information in the bookmark that identifies the requestor that requested generation of the bookmark. Next, the flow proceeds to block 211 where the processing unit associates the bookmark with the instance of content before the flow returns to block 202 and the content player continues to operate.

Although the method 200 is illustrated and described as including specific operations performed in a specific order, it should be understood that this is for the purposes of example. Other operations performed in other orders are possible without departing from the scope of the present disclosure. For example, creation of the bookmark in block 209, inclusion of identification information in block 210, and association of the bookmark with the instance of content in block 211 are shown as sequential, separate operations. However, in other implementations creation of a bookmark that includes identification information and is associated with an instance of content may be performed simultaneous as part of a single operation.

Figure 3A:
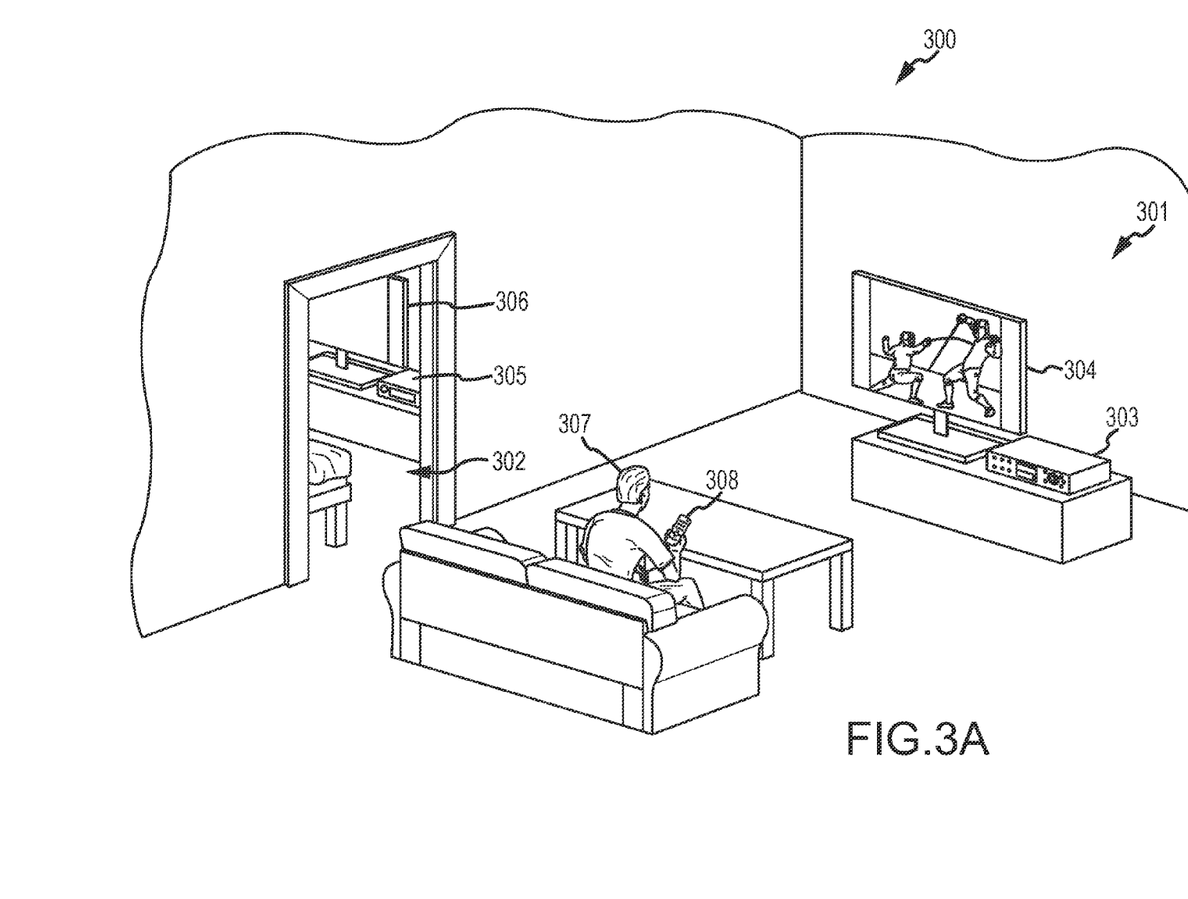
FIGS. 3A-3E are diagrams illustrating a user utilizing a system for differentiating bookmarks in content access lists shared among multiple content player devices. The system may be the system of FIG. 1.

FIGS. 3A-3E illustrate a user 307 utilizing a system 300 for differentiating bookmarks in content access lists shared among multiple content player devices. The system 300 may be the system 100 of FIG. 1. As illustrated in FIG. 3A, a living room 301 includes a set top box 303 connected to a television 304. Adjacent to the living room is a bedroom 302 that includes a set top box 305 connected to a television 306. In the system 300, the living room set top box 303 and the bedroom set top box 305 are connected via a network (not shown). The living room set top box 303 is operable to store content. However, the bedroom set top box 305 may not be operable to store content. Instead, the living room set top box 303 may maintain a content access list of content stored by the living room set top box 303 and may share this list with the bedroom set top box 305. As such, the bedroom set top box 305 may utilize the content access list to access the content stored by the living room set top box 303.

Figure 3B:
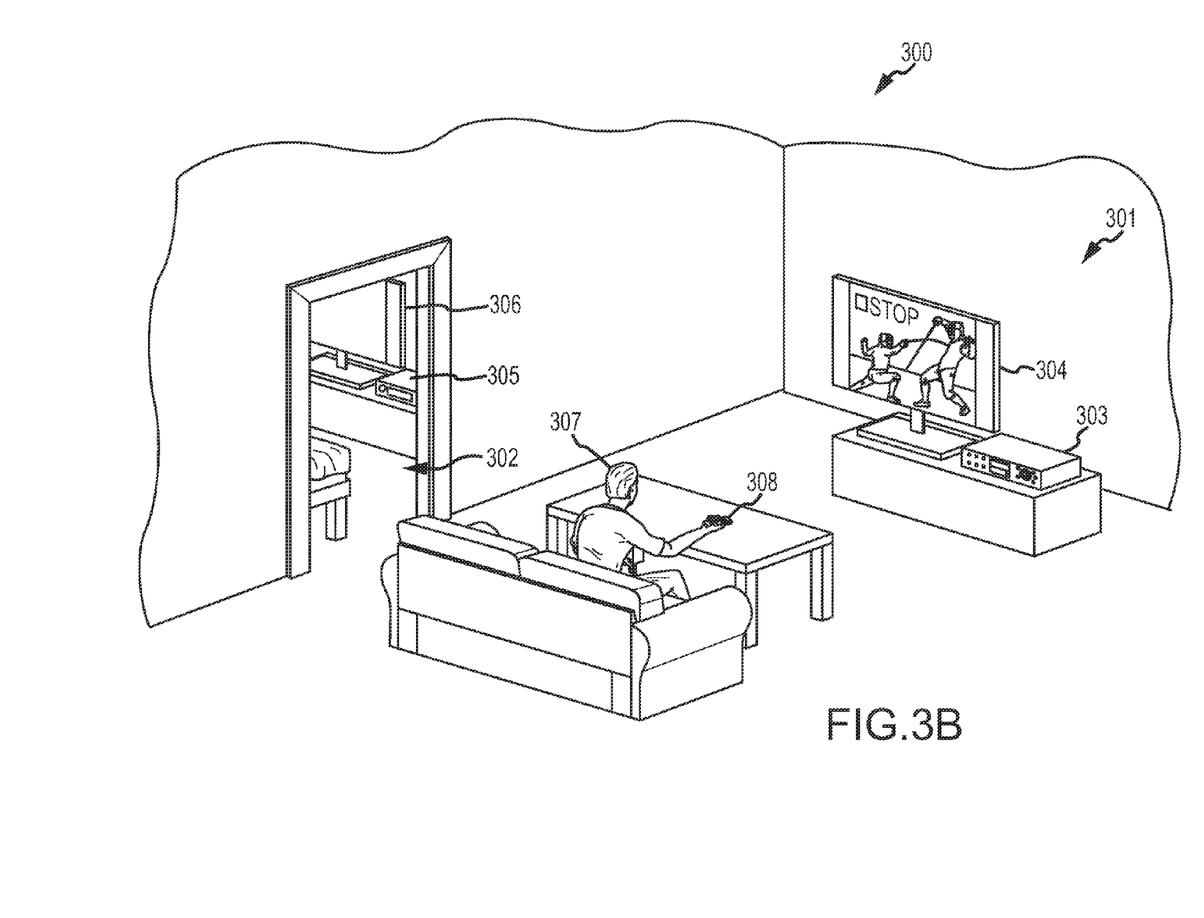

As also illustrated in FIG. 3A, the user 307 is watching a movie titled "Movie XYZ" that is stored by the living room set top box 303 and presented by the living room set top box 303 on the living room television 304. As illustrated in FIG. 3B, the user utilizes a remote 308 to stop presentation of "Movie XYZ." In response, the living room set top box 303 stops presentation of "Movie XYZ" and creates a last-watched bookmark, including identifying information identifying that the requestor is the living room set top box 303 (identified to the system as "Living Room") as utilized by the user (identified to the system 300 as "Dad"), and associates the bookmark with the stored "Movie XYZ."

Figure 3C:
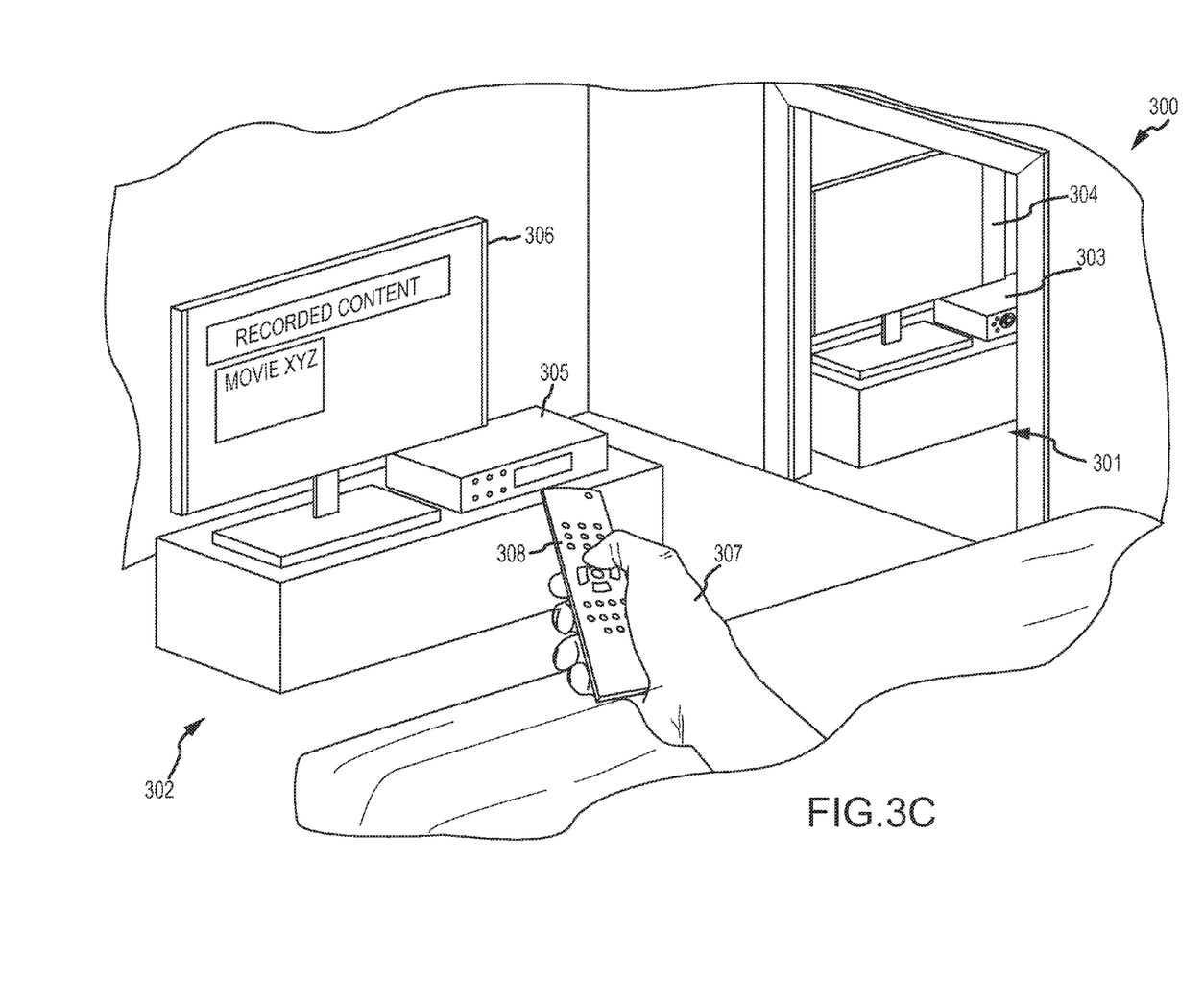
Figure 3D:
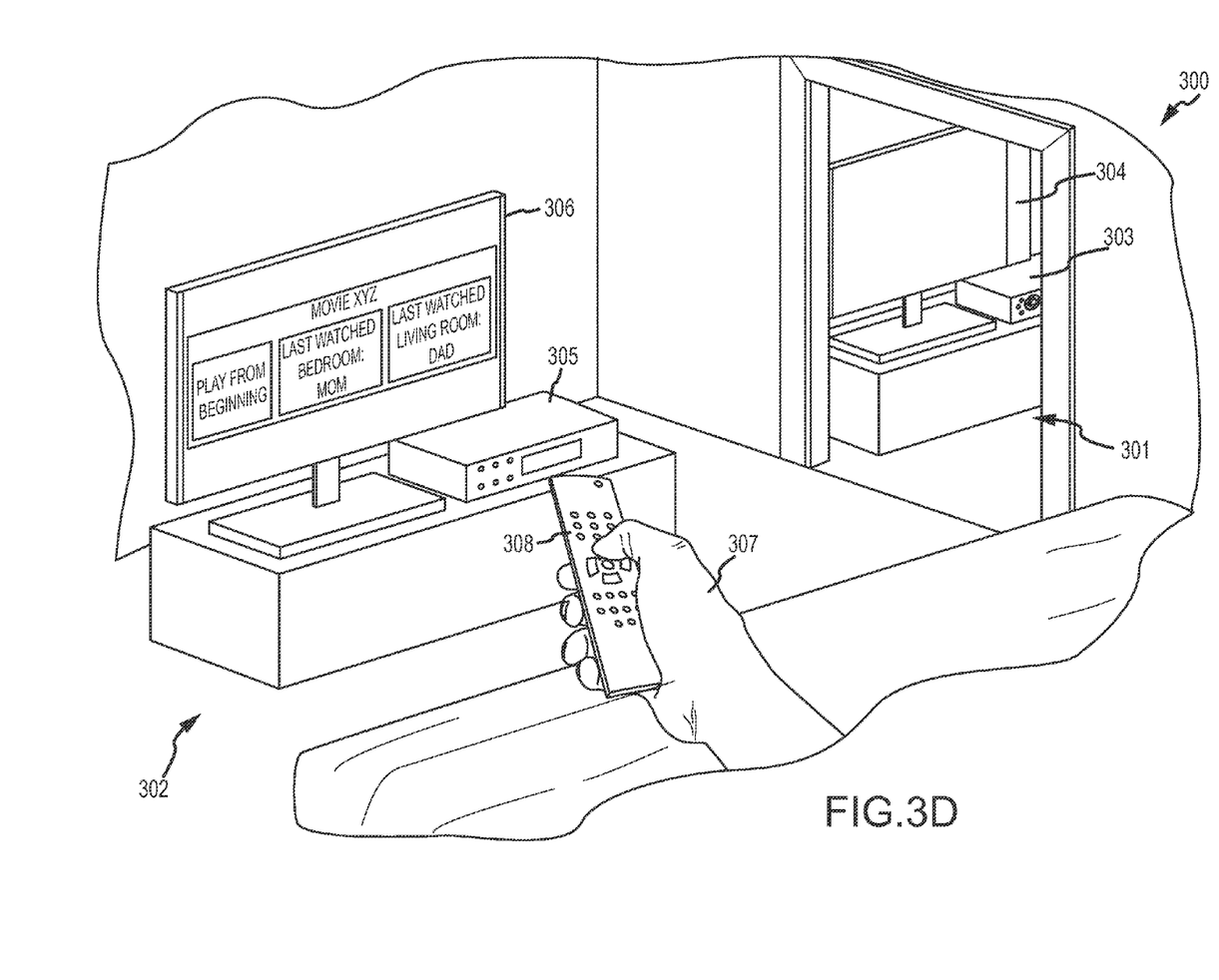

As illustrated in FIG. 3C, the user 307 enters the bedroom 302 and utilizes the remote 308 to turn on the bedroom set top box 305 and television 306. As illustrated, the bedroom set top box 305 presents the content access list that shows "Movie XYZ" is available to access from the living room set top box 303. The user may utilize the remote to select "Movie XYZ." As a result, as illustrated in FIG. 3D, the bedroom set top box 305 may display a sub list for "Movie XYZ" on television 306.

Figure 3E:
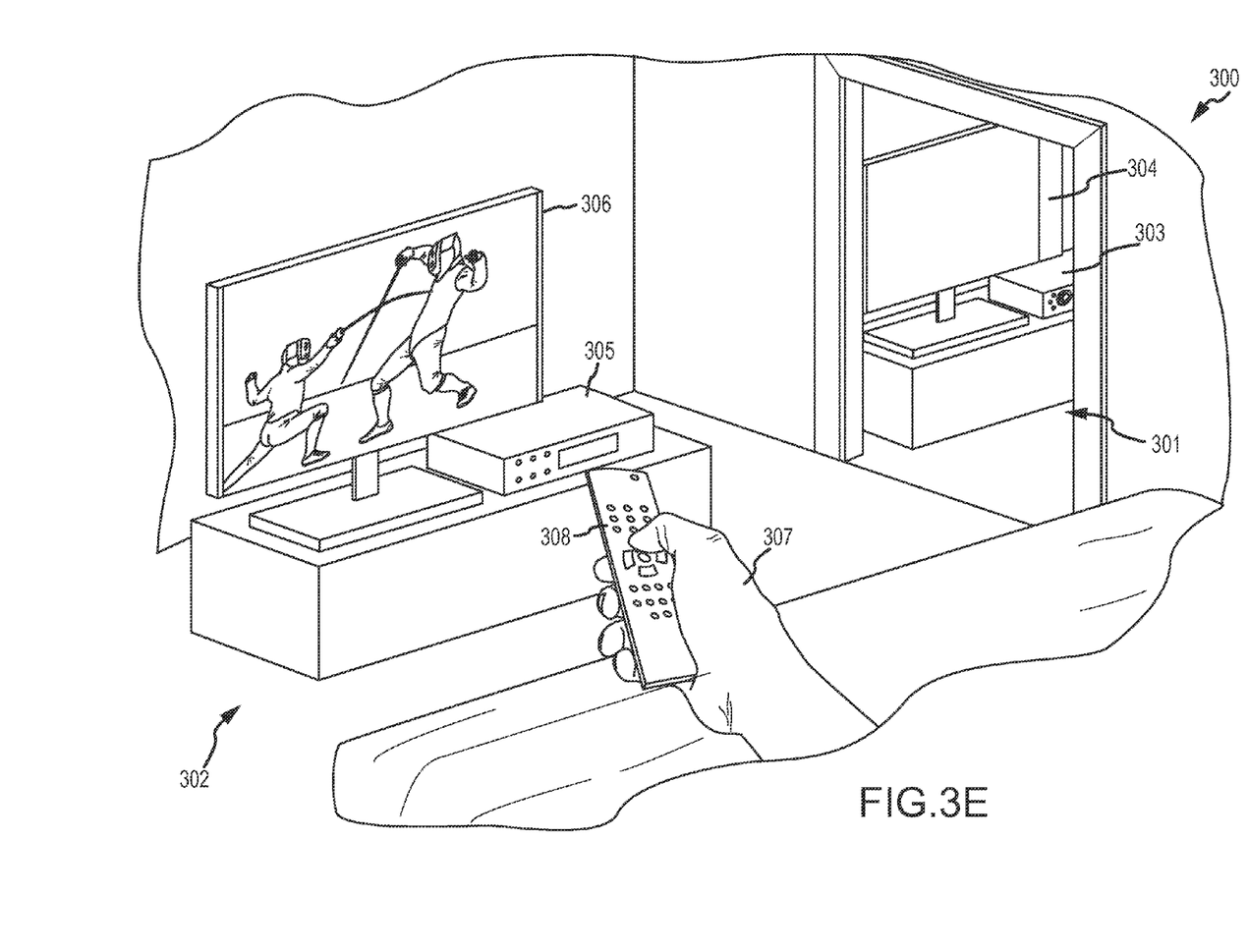

As illustrated, the sub list for "Movie XYZ" includes a number of different options for playing "Movie XYZ." In this example, previous to the bookmark described as created in FIG. 3B, the "Movie XYZ" already included a last watched bookmark for the user "Mom" created via the bedroom set top box 305. Thus, sub list for "Movie XYZ" is displayed as including a "Play from beginning" option as well as a "Last Watched Bedroom:Mom" option corresponding to the last watched bookmark for the user "Mom" created via the bedroom set top box 305 and a "Last Watched Living Room:Dad" option corresponding to the bookmark described as created in FIG. 3B. In this example, the user 307 utilizes the remote 308 to select the "Last Watched Living Room:Dad" option. As a result, as illustrated in FIG. 3E, the bedroom set top box 305 presents "Movie XYZ" on the television 306 at the point where the user 307 previously stopped watching in FIG. 3B.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for differentiating bookmarks in content access lists shared among multiple content player devices, the method comprising:
   accessing, for a first time and for a second time, at least one instance of content via a content access list that lists the at least one instance of content, utilizing at least one content player of a plurality of networked content players, wherein the content access list is shared among the plurality of networked content players and wherein each of the plurality of networked content players can utilize the content access list to access the at least one instance of content listed by the content access list;
   associating at least first and second bookmarks with the at least one instance of content utilizing the at least one content player wherein the first bookmark is associated with the at least one instance of content in response to the accessing for the first time and the second bookmark is associated with the at least one instance of content in response to the accessing for the second time; and
   including, utilizing the at least one content player, identification information in each of the at least first and second bookmarks that identifies a requestor that requested generation of the at least first and second bookmarks, wherein the requestor that requested generation of the first bookmark comprises the at least one content player and the requestor that requested generation of the second bookmark comprises at least one specified user, wherein including identification information comprising the at least one content player is performed in response to an event wherein the content player initiates associating the at least one bookmark in response to a stop or pause playback command issued from the at least one specified user wherein playback of the at least one instance of content discontinues subsequent to the issuance of such command, and wherein including identification information comprising the at least one specified user is performed in response to an event wherein the content player initiates the associating the at least one bookmark in response to a bookmark generation command issued from the at least one specified user for revisiting a portion of the at least one instance of content wherein playback of the at least one instance of content continues subsequent to the issuance of such command.

2. The method of claim 1, further comprising:
   presenting the content access list, utilizing the at least one content player, by listing the at least one instance of content, the at least one bookmark, and the identification information included in the at least one bookmark that identifies the requestor that requested generation of the at least one bookmark.

3. The method of claim 2, wherein said operation of presenting the content access list also lists at least one additional bookmark associated with the at least one instance of content and additional identification information included in the at least one additional bookmark that identifies a requestor that requested generation of the at least one additional bookmark wherein the requestor that requested generation of the at least one bookmark and the requestor that requested generation of the at least one additional bookmark are different requestors.

4. The method of claim 3, further comprising accessing a portion of the at least one instance of content corresponding to at least one of the at least one bookmark or the at least one additional bookmark in response to user input received in response to said operation of presenting the content access list.

5. The method of claim 2, wherein said operation of presenting the content access list also lists recorder information associated with the at least one instance of content that identifies one of the plurality of networked content players that recorded the at least one instance of content.

6. The method of claim 2, wherein:
   at least one additional bookmark is associated with the at least one instance of content and includes additional identification information identifying a requestor that requested generation of the at least one additional bookmark wherein the requestor that requested generation of the at least one bookmark and the requestor that requested generation of the at least one additional bookmark are different requestors and
   wherein said operation of presenting the content access list omits the at least one additional bookmark when said operation of presenting the content access list is performed in response to at least one input received from the requestor that requested generation of the at least one bookmark.

7. The method of claim 1, wherein the at least one bookmark comprises at least one of a marker corresponding to a last accessed portion of the at least one instance of content or a marker corresponding to a user specified portion of the at least one instance of content.

8. The method of claim 1, wherein each of the plurality of networked content players can utilize the content access list to access a plurality of instances of content listed by the content access list that includes the at least one instance of content wherein the plurality of instances of content are stored by at least one of the plurality of networked content players.

9. The method of claim 8, wherein the at least one content player comprises a thin client that stores none of the plurality of instances of content listed by the content access list.

10. The method of claim 1, further comprising storing an entirety of the at least one instance of content in a media storage device, prior to the step of accessing.

11. A system for differentiating bookmarks in content access lists shared among multiple content player devices, comprising:
- at least one content player of a plurality of networked content players, comprising:
- at least one content storage component that stores an entirety of at least one instance of content;
- at least one communication component; and
- at least one processing unit that accesses, for a first time and for a second time the stored entirety of the at least one instance of content, utilizing the at least one communication component, via a content access list that lists the at least one instance of content, wherein each of the plurality of networked content players can utilize the content access list to access the at least one instance of content listed by the content access list;
- wherein the at least one processing unit associates at least first and second bookmarks with the at least one instance of content wherein the first bookmark is associated with the at least one instance of content in response to the accessing for the first time and the second bookmark is associated with the at least one instance of content in response to the accessing for the second time and includes identification information in each of the at least first and second bookmarks that identifies a requestor that requested generation of the at least first and second bookmarks, and
- wherein the requestor that requested generation of the first bookmark comprises the at least one content player and the requestor that requested generation of the second bookmark comprises at least one specified user, wherein the processing unit including identification information comprising the at least one content player is performed in response to an event wherein the content player initiates associating the at least one bookmark in response to a stop or pause playback command issued from the at least one specified user wherein playback of the at least one instance of content discontinues subsequent to the issuance of such command, and wherein the processing unit including identification information comprising the at least one specified user is performed in response to an event wherein the content player initiates the associating the at least one bookmark in response to a bookmark generation command issued from the at least one specified user for revisiting a portion of the at least one instance of content wherein playback of the at least one instance of content continues subsequent to the issuance of such command.

12. The system of claim 11, wherein each of the plurality of networked content players can utilize the content access list to access a plurality of instances of content listed by the content access list that includes the at least one instance of content wherein the plurality of instances of content are stored by at least one of the plurality of networked content players.

13. The system of claim 12, wherein the at least one content player comprises a thin client that stores none of the plurality of instances of content listed by the content access list.

14. The system of claim 11, wherein the at least one bookmark comprises at least one of a marker corresponding to a last accessed portion of the at least one instance of content or a marker corresponding to a user specified portion of the at least one instance of content.

15. The system of claim 11, further comprising at least one output component wherein the at least one processing unit presents the content access list, utilizing the at least one output component, by listing the at least one instance of content, the at least one bookmark, and the identification information included in the at least one bookmark that identifies the requestor that requested generation of the at least one bookmark.

16. The system of claim 15, wherein the at least one processing unit also lists at least one additional bookmark associated with the at least one instance of content and additional identification information included in the at least one additional bookmark that identifies a requestor that requested generation of the at least one additional bookmark as part of presenting the content access list
- wherein the requestor that requested generation of the at least one bookmark and the requestor that requested generation of the at least one additional bookmark are different requestors.

17. The system of claim 16, wherein the at least one processing unit accesses a portion of the at least one instance of content corresponding to at least one of the at least one bookmark or the at least one additional bookmark in response to user input received via the at least one communication component in response to the presented content access list.

18. The system of claim 15, wherein the at least one processing unit also lists recorder information as part of presenting the content access list that is associated with the at least one instance of content that identifies one of the plurality of networked content players that recorded the at least one instance of content.

19. The system of claim 15, wherein:
- at least one additional bookmark is associated with the at least one instance of content and includes additional identification information identifying a requestor that requested generation of the at least one additional bookmark wherein the requestor that requested generation of the at least one bookmark and the requestor that requested generation of the at least one additional bookmark are different requestors and
- wherein the at least one processing unit omits the at least one additional bookmark when presenting the content access list in response to at least one input received via the at least one communication component from the requestor that requested generation of the at least one bookmark.

20. A method for differentiating bookmarks in content access lists shared among multiple content player devices, the method comprising:
- storing an entirety of at least one instance of content in a media storage device, and associating with the at least on instance of content a content access list that lists the at least one instance of content
- accessing, for a first time and for a second time, the stored entirety of the at least one instance of content via the content access list that lists the at least one instance of content, utilizing at least one content player of a plurality of networked content players, wherein the content access list is shared among the plurality of networked content players and wherein each of the plurality of networked content players can utilize the content access list to access the at least one instance of content listed by the content access list;
- associating at least first and second bookmarks with the stored entirety of the at least one instance of content utilizing the at least one content player, wherein the first bookmark is associated with the at least one instance of content in response to the accessing for the first time and the second bookmark is associated with the at least one instance of content in response to the accessing for the second time; and including, utilizing the at least one content player, identification information in the at least first and second bookmarks that identifies a requestor that requested generation of the at least first and second bookmark, wherein the requestor that requested generation of the at least one first bookmark comprises either the at least one content player and the requestor that requested generation of the second bookmark comprises at least one specified user, wherein including identification information comprising the at least one content player is performed in response to an event wherein the content player initiates associating the at least one bookmark in response to a stop or pause playback command issued from the at least one specified user wherein playback of the at least one instance of content discontinues subsequent to the issuance of such command, and wherein including identification information comprising the at least one content player is performed in response to an event wherein the content player initiates associating the at least one bookmark in response to a bookmark generation command issued from the at least one specified user for revisiting a portion of the at least one instance of content wherein playback of the at least one instance of content continues subsequent to the issuance of such command.

* * * * *

UNITED STATES PATENT AND TRADEMARK OFFICE
CERTIFICATE OF CORRECTION

PATENT NO. : 8,966,042 B2
APPLICATION NO. : 13/301312
DATED : February 24, 2015
INVENTOR(S) : Paul A. Langer and Dan J. Minnick It is certified that error appears in the above-identified patent and that said Letters Patent is hereby corrected as shown below:

In the Claims

In Claim 11, Column 11, Line 10 - a "," should be placed after the word "time"

Signed and Sealed this
Ninth Day of February, 2016

Michelle K. Lee
*Director of the United States Patent and Trademark Office*